(12) United States Patent
Polychronopoylos

(10) Patent No.: US 6,341,499 B1
(45) Date of Patent: Jan. 29, 2002

(54) EVAPORATIVE AIR-COOLING SYSTEM

(76) Inventor: Assimios Polychronopoylos, 39 Sevastias Str, Athens (GR), GR-15771

( * ) Notice: Subject to any disclaimer, the term of this patent is extended or adjusted under 35 U.S.C. 154(b) by 0 days.

(21) Appl. No.: 09/403,646

(22) PCT Filed: May 8, 1998

(86) PCT No.: PCT/GR98/00014

§ 371 Date: Oct. 22, 1999

§ 102(e) Date: Oct. 22, 1999

(87) PCT Pub. No.: WO98/51972

PCT Pub. Date: Nov. 19, 1998

(30) Foreign Application Priority Data

May 15, 1997 (GR) .......................................... 970100186

(51) Int. Cl.$^7$ ................................................. F28D 5/00
(52) U.S. Cl. ........................................ 62/310; 62/304
(58) Field of Search .................... 62/304, 310, 121, 62/171

(56) References Cited

U.S. PATENT DOCUMENTS 2,914,308 A * 11/1959 Bock .......................... 261/104
5,946,931 A * 9/1999 Lomax et al. ................ 62/304

* cited by examiner

Primary Examiner—Henry Bennett
Assistant Examiner—Melvin Jones

(57) ABSTRACT

With the proposed evaporative air-cooling system, we can achieve the reduction of the temperature of a space by making use of the natural characteristic of water to absorb heat during its vaporization from the body with which it is in contact. It comprises large wet surfaces created with a small mass of water within a limited space due to the activation of the molecular powers of water and of other material with molecular powers relevant to the ones of water. These wet surfaces are thin cloths, made of cotton or other material with features similar to that of cotton, impregnated with water in a controlled manner so that they can be kept wet at all times. These moistened cloths (12) are placed on bodies (G2) inside which the air of the space to be cooled circulates. Thus, when a vaporization is effected from the wet surfaces into the free atmosphere, heat is absorbed by these bodies producing a "vaporization cold" inside them. Likewise, when the air of the cooled spaces circulates inside these bodies, it leaves heat on them causing in this way the temperature of the cooled space to decrease. This decreased temperature can be by many degrees lower than the temperature of the environment depending on the factors affecting the vaporization speed, among which the relative moisture of the environment where these evaporative air cooling systems operate is the principal.

9 Claims, 3 Drawing Sheets

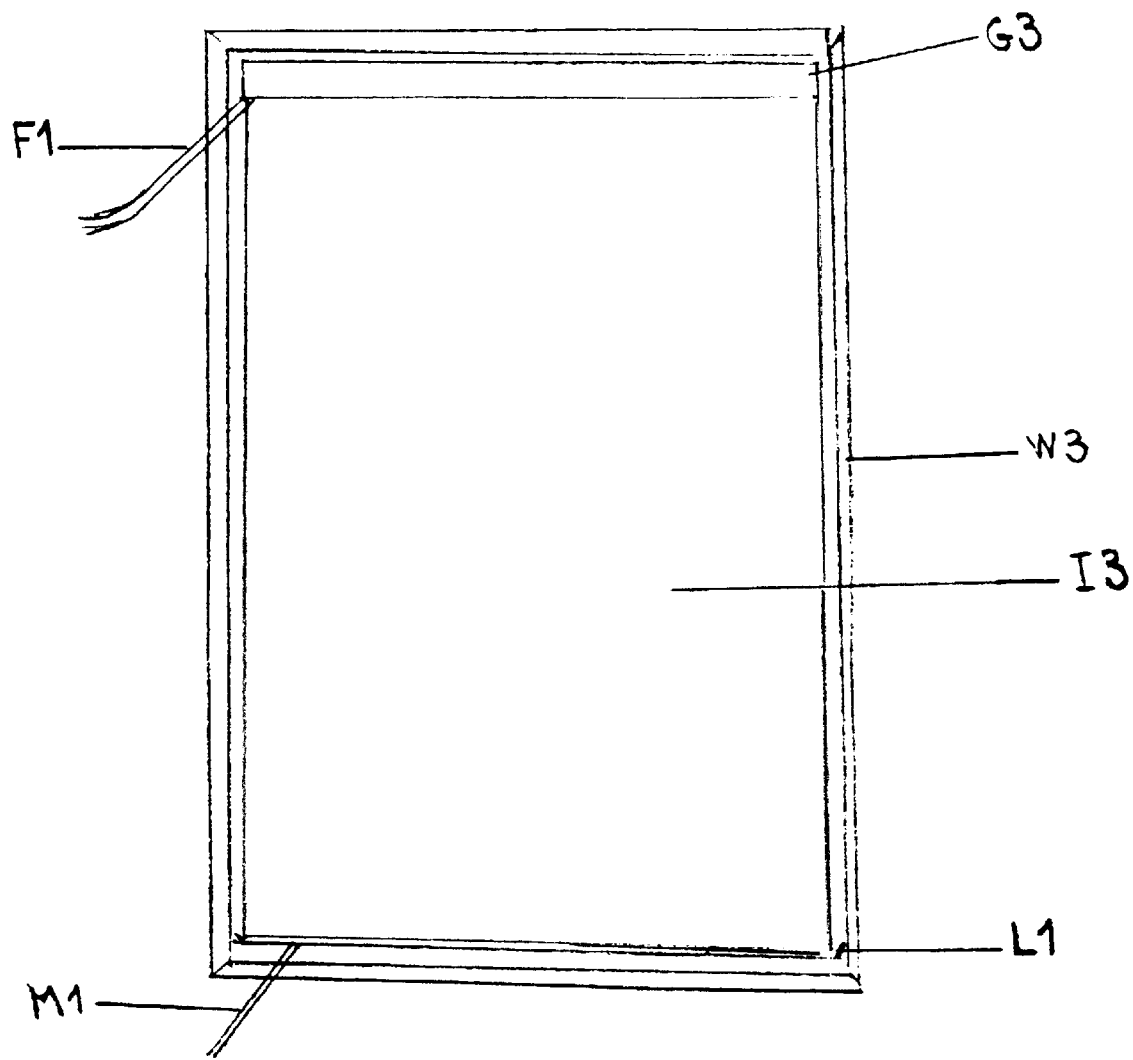

EVAPORATIVE AIR-COOLING SYSTEM

TECHNICAL FIELD

This invention relates to air cooling systems of spaces (domiciles, offices, stores etc.) whose desirable temperature is around 24° C. The evaporative air cooling system consists of large moist surfaces which are created by a small mass of water within limited spaces and which can make use of the cooling effect caused by the vaporization of water into the free atmosphere, i.e. the ability of water to absorb heat during its vaporization. For the creation of these wet surfaces, the molecular powers of water (the powers of cohesion and relevance) as well as of other material with molecular powers relevant to those of the water, such as cotton, glass, metals etc are activated.

BACKGROUND ART

Evaporative coolers have been in use for many years as a cheap means of cooling. Such systems make use of the ability of water to absorb heat during its vaporization. Evaporative coolers are divided into two main categories: i) systems of direct cooling, ii) systems of indirect cooling. The systems of the first category, that is, the systems of direct cooling, exploit the cooling effect of water vaporization that takes place into the space to be cooled. Those systems suffer a major defect, since they cause the humidity of the air to increase and reach the point of saturation, a fact that makes those spaces unsuitable for habitation. Moreover, as the humidity increases, their performance decreases rapidly.

The technique of most of the indirect cooling systems is based on the cooling of an airstream by adiabatic saturation, which, in turn, is used to cool an airstream of the cooled space by heat conduction, which takes place into air-channels through which the cool air and the air of the space to be cooled circulate without mixing together. This method does not cause an increase of the absolute moisture of the space, however, it has a low performance. Many indirect evaporative coolers, in an attempt to improve their performance, use various systems of pre-cooling and dehumidification of the air that is cooled by adiabatic saturation, something which leads to costly and bulky arrangements and therefore not suitable for wider use.

The water feed device described in European Patent Application EP 0713060 A1 is a system of controlled feeding with water of a humidifier which is part of a special air-conditioning arrangement. However, it can use only pure or ultra pure water and it cannot create large moist surfaces within a limited space. Therefore, it is unsuitable for wider use in evaporative coolers for the cooling of habitable spaces.

The evaporative air-cooling systems of the present invention have the ability to create very large moist surfaces in a controllable way from which we exploit the cooling effect of the vaporization into the free atmosphere. Thus, the performance of these systems is almost constant without increasing the absolute moisture of the cooled space. In regions where the climate is hot and dry, the systems can replace in a cheap and friendly to the environment way, the heat pumps (air-conditioners) which have the following disadvantages:

i) They have a high buying cost and therefore they are inaccessible to large groups of the population. ii) Their function is very energy-consuming and, therefore, costly and detrimental to the environment. Moreover, the simultaneous use of a large number of them requires a huge power network that many countries cannot have. iii) The need for a regular maintenance by a trained staff which is quite expensive. iv) The danger of accidents. v) Their performance according to the Japanese standards JIS is measured under a temperature of 35° C. outdoors and 27° C. indoors. When the temperature of the environment exceeds 35° C. they present a major failure in their performance whereas for temperatures over 44° C., no guarantee of safe function is provided. vi) They cause a thermal pollution of the surroundings because they work as simple pumps of heat. They also pollute the atmosphere by dispersing the freon they use. vii) They do not renew the air of the space they cool. viii) In dry climates, such as the one in Greece, see Tables I and III, they dry the space that they cool even though this space is usually already in need of hydration.

SUMMARY OF THE INVENTION

The invention aims to create and maintain large wet surfaces with only a small mass of water and within a limited space, for the creation of which the molecular powers of water and of other material which present relevant molecular powers, e.g. cotton, metals, glass etc. are left to act. The invention makes use of the cooling effect caused by the vaporization of water on these surfaces into the free atmosphere. It contains a water source consisted of a pair of containers (A1) and (B1), linked together by a flexible pipe (C1) which allows the free movement of the container (B1). On the pipe there is a switch (E1). The pair of the containers is set on such a level so as to allow another pipe (F1) to feed other groovy-shaped containers with water from the container (B1) as communicating vessels. These new containers (G1) moisten cloths made of cotton which are in contact with and in fact cover the entire outside surface of containers of a (G2) type with small volume and large surface, whose side walls are made of a thin substance of a high thermal conductivity (e.g. copper, aluminium). These containers which are covered by the wet cloths are connected with insulated air-channels (S1) and (S2) through which and with the help of an electrical circulator (T1) (fan), the air of the air-conditioned (air-cooled) space circulates. In this way when a vaporization is effected through the wet cloths which cover the surface of the containers, the heat which is absorbed in priority is the one of the containers and of the air which moves inside them, causing inside the container a "vaporizing cold". Therefore, when the air circulates inside the containers, it touches the walls producing heat and returns through the air-channel (S2) into the cooled room at a lower temperature. The heat that has been left onto the walls of the container is conducted to the small mass of water which lies on the surface of the containers and raises its temperature and its vaporization speed.

The evaporative air-cooling system in one of its realizations uses the openings of the rooms to be cooled, which are made of glass, e.g. doors or windows or of other non-perishable by water material, and places wet cloths on them, so that in the event of a vaporization from these surfaces into the free atmosphere, the heat needed in such a vaporization will be absorbed by the glass of these openings and as a result by the air inside the room, turning these partitions made of glass from principal gates of heat entry to gates of heat exit.

The system may also include an electrical fan which will be creating air streams onto the wet surface in order to accelerate the vaporization.

It may also include a system of collection and recycling of water which is not vaporized and through a pipe is sent into a container whereby it returns to the feeding container by means of a pump.

It may as well include a thermostat inside the room it cools, which will be activating the circulator and the fan. Furthermore, the system may include an air filter and a frame of variable extent with which the air will be cleaned and it will be renewed up to the desirable degree.

Finally, the system may include an outdoor thermostat which, by means of an electrical mechanism and according to the temperature of the environment, will serve to adjust the level of the container (B1) which in turn affects the quantity of water used to moisten the cotton cloths, so that the needs of the vaporization can be served.

BRIEF DESCRIPTION OF THE DRAWINGS

FIG. 3 which is also complementary to FIG. 1, shows a window whose part of glass is covered by a wet cloth.

Figure 1:
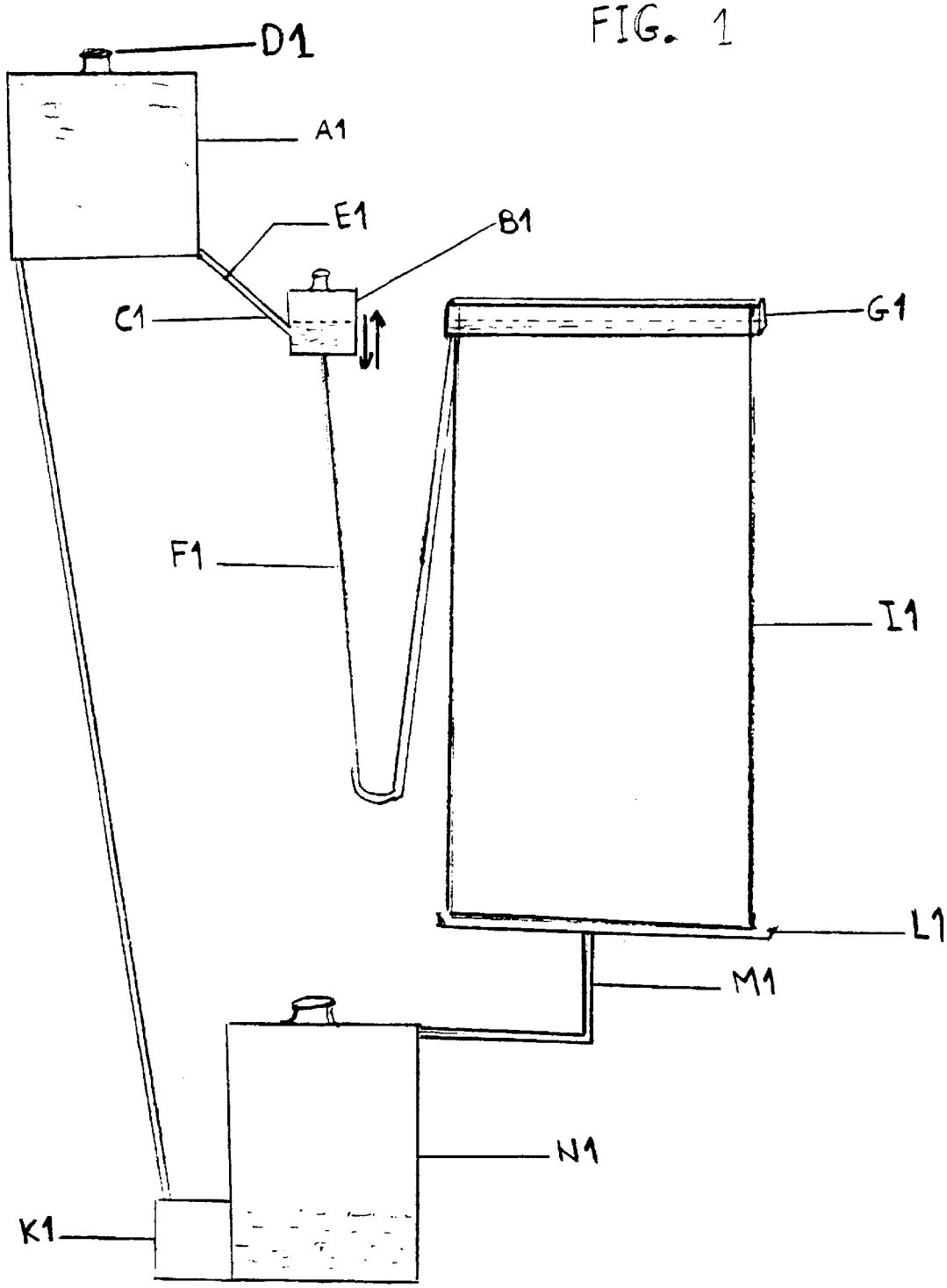
FIG. 1 shows the way in which the wet surfaces are created and the way in which water which was not vaporized is recollected and returns to the feeding container through a pump.

The description of these drawings as regards the sizes and material used serve only as examples and they do not in any way constitute a limitation of the invention.

DETAILED DESCRIPTION OF THE INVENTION

The amount of energy in the form of heat used in the transformation of water into steam of the same temperature is 2258 j/g. In order to assess the size of this amount, it would be sufficient to say that the energy consumed in the vaporization of 1,6 kg of water is equal to the heat produced by an electrical power of 1 KWH. Accordingly, the vaporization of 265 g of water consumes heat which lowers the temperature of 50 m$^3$ of atmospheric air by 10° C. During the vaporization of the water, the heat required is subtracted by the environment and in fact it is subtracted in priority from the mass of water and the body to which it gets in contact with. This phenomenon, i.e. the consumption of heat, for the vaporization of water produces cold, namely a "vaporization cold". This "vaporization cold" has been used ever since the antiquity as it appears from the clay jars which are used even to this day in order to keep water cool during the hot days of summer in areas where there are no refrigerators. The ability of these jars to cool is based on the penetratability of their walls from the molecules of water which as soon as they come out onto the external surface, they tend to get evaporated subtracting heat from the jar and the water which these jars contain. The ability of these jars diminishes gradually as the penetratability of their walls starts to disappear because of the solid substances dissolved in water.

The subtraction of heat during the vaporization of water from the surface of the clay jar can cause a reduction of the temperature of water found inside the jar by many degrees lower than the temperature of the surroundings of the jar, inside which the vaporization takes place. The extent of the difference is defined by the temperature of the environment and the vaporization speed, whereas the factors which affect the vaporization speed, known as the <<rules of vaporization>> are the following:

a) Vaporization depends on the surface of the water b) . . . on the temperature of the water to be vaporized c) . . . on the moisture of the environment into which the vaporization takes place d) . . . on the existence of air streams on the surface of the water The cooling abilities of a clay jar can be found in every container as long as a vaporization of water can take place on its surface. For instance, if one takes a metal container and covers the whole of its external surface with a thin cotton cloth which one must make sure to keep wet at all times (see below ways used in this application to keep the cloths wet), when the container is found in an environment of relative moisture less than 100% due to the vaporization which will take place on its wet surfaces, a <<vaporization cold>> will appear inside the container. Accordingly, if the container is connected with two insulated air-channels through which the air of the room we want to cool can be circulated with the help of an electrical air-circulator, then the air of the room which will pass through the container will get in contact with the colder walls of the container and will bring them heat and in this way it will return to the room with a lower temperature. The cooling of the air will be faster when the walls of the container are thin and made of a material of high thermal conductivity, e.g. copper, aluminium etc., especially when their internal surface is coarse and infurbished. By having a high thermal conductivity, the walls take up the heat of the air, which circulates inside the container and comes in contact with them, faster and by being thin the walls conduce the heat they have taken up more rapidly onto the mass of water found on the surface of the container and held by the molecular powers of water and cotton, causing the temperature of water to raise and as a result causing the vaporization speed to accelerate. In this way, very large surfaces can be created in order to absorb very large amounts of heat during the process of vaporization on these surfaces. However, for the degree of exploitation of the cooling effect of the vaporization and for the effectiveness with which it can be applied in order to cool spaces (to a desirable temperature, i.e. around 24° C.) the vital question is not simply the quantity of heat which will be absorbed during the vaporization but also the quality of the cold produced by the vaporization, i.e. the difference between the temperature found inside the room to be cooled, covered by wet surfaces, and the one of the environment. To define this difference i.e. <<the vaporization cold>>, caused by the vaporization within a given place and time, we need to know the temperature and the moisture of this place at that time.

To measure relative moisture, a type of hygrometer is used, consisted of two thermometers, one of which is covered by a cloth constantly impregnated with water. The less the moisture, the faster the water evaporates and the lower the indication of this thermometer is, whereas the second one always points the air temperature. The relative moisture can be found by tables showing the different indications. Using these tables and provided we are given the figures of temperature and relative moisture we can also estimate the indication of the wet thermometer, i.e. the difference in temperature under specific figures of temperature and moisture. Acting in this way for the figures of temperature and relative moisture of Table I, let us examine Tables III and IV. We see that for a temperature of 24,5° C. and a relative moisture of 54,6% at 09.00 hours, the wet thermometer points 19° C., i.e. it has a difference of temperature by 5.50° C. When by contrast the temperature at 15.00 h reaches 31,9° C. and the relative moisture is 34,1% the wet thermometer points 21° C. which means that the difference of temperature is 10.8° C. Therefore, we observe that although there was an increase of temperature between 09.00 h and 15.00 h by 7.4° C., the indication on the wet thermometer has been higher only by 2 degrees. The same effects and indeed even greater differences will be observed on Table IV where we can see the highest figures of temperature and the lowest figures of relative moisture. Thus, we conclude that when the temperature increases and the relative moisture decreases, the temperature on the wet thermometer remains almost steady, despite the increase of the difference in temperature. The data on Tables III and IV show that for the conditions of temperature and relative moisture of Table I, which constitute the figures reported for Athens and its Basin representing its climate during the hot season for many years, the temperature on the wet thermometer is always lower than 24° C. which is the ideal temperature for people to live and work, according to experts, even in times of extremely warm temperatures. The prices of the wet thermometer shown on Tables III and IV in the column <<wet thermometer >> are prices taken under conditions of dead calm, i.e. without air streams on the surface where the vaporization is effected. The existence of natural streams of air on the vaporization surfaces or the creation of artificial ones by means of fans accelerates the vaporization and the indication on the wet thermometer can be even lower by many degrees depending on the intensity of these streams. From the above, it appears that for an environment with a climate similar to Table I, the vaporization results in a <<vaporization cold>> which has the quality to be used for cooling of free spaces.

With the help of FIG. 1, a way of constant and controlled moisturizing of the surfaces from which the vaporization takes place will be presented below. Moreover, an application to withhold and use the cooling effect caused by the vaporization for the cooling of spaces will appear by observing FIGS. 2 and 3, both complementary to FIG. 1.

In FIG. 1 a container filled with water (A1) is stable and closed air tight with a lid (D1). With a small-sized flexible pipe (C1), of 20 cm for example, with a switch (E1) on, we connect the bed of the container (A1) with a small container (B1) which has been placed in such a way that it can easily move up and down thanks to the flexible pipe. The container (B1) whose lid is open is placed on the same height or somewhat lower than the bed of the container (A1). When we open the switch (E1), water in the container (A1) flows towards the container (B1) whereas at the same time air comes into the container (A1). The pipe (C1) must be in such a position so as to facilitate the entrance of air when its opening to the container (B1) is not covered by water, i.e. there must be no part of it with a curve which will be hemming the air.

However, when the level of water in the container (B1) reaches that of the opening of the pipe (C1), water blocks the opening and as a result it does not let air come into the container (A1) which in turn stops water from coming into the container (B1). At that moment, inside the container (A1) subpressure is being created and therefore its walls must fight against deformation due to the greater pressure exercised by the atmosphere.

In this way, we keep the level of water inside the container (B1) stable and equal to the level of the opening of the pipe (C1), because, if we substract water from the container (B1) until the level goes lower than the opening of the pipe, air will come into the container (A1) and water will come out until it blocks again the opening of the pipe.

The pair of containers (A1) and (B1) described above, does not constitute the only possible system of feeding. This can be replaced by a container of the type (B1) with a float which will be fed with water from a central network of water or from another container. What is needed in this case is that the container (B1) must always have a constant level of water and that it can easily move up and down.

Let us connect now the bed of the container (B1) by means of a pipe (F1) with the bed of a groovy-shaped container (G1), set in an upright position and left open on top. The pipe (F1) must not be folded or curved so as to avoid air being hemmed inside it, inhibiting the normal flow of water through it, i.e. it must be assured that the level of water in the container (B1) is always the same with that of water in the container (G1). The length of the pipe may vary as long as the conditions above are fulfilled. As a result the distance of the container (G1) from the pair of the containers (A1)–(B1) can be either short or long. The dimensions of the container (G1) must be such that it has the smallest free surface and the smallest possible volume, e.g. height 6 cm, length 50 cm, and width 1 cm (these sizes, are not binding). The same applies for the surface and volume of the container (B1). By connecting containers (B1) and (G1) with the pipe (F1) we can create communicating vessels and as a result the level of water in the containers (B1) and (G1) will be the same, i.e. at the level of the opening of the pipe (C1), or in the case of a single container with a float it will be on the level where the float allows water to come out. If inside the container (G1), where we have adjusted the level of water to be 4 cm we plunge the end of an unfolded cotton cloth (I1), we will observe that the cloth will start to get wet well over the lever of water and gradually the moisture will cover the whole cloth. The powers acting for the moisturizing of the cloth are on one hand the molecular powers of cohesion and relevance in both water and the cloth and on the other hand the gravity. If the experiment takes place in an environment of saturated moisture, i.e. where there is no vaporization, when the whole cloth is wet, the water will flow from the lower end of the cloth which will be suspended and the quantity of flow will be equal to the quantity absorbed by the cloth from the container (G1). We put at the lower end of the cloth a water collector (L1) in the shape of a groove and we connect it with a pipe (M1) so that it brings the water into a collection container (N1). Until the water of the container (A1) is run out, the level of water inside the container (G1) remains steady. If we raise the level of water in the container (G1) so that it is 5 cm and we plunge the cotton cloth as already described above, we will observe that the cloth will get wet in much less time than before and much faster than when then level was 4 cm and when the cloth will be totally covered by water, the water flowing inside the container (N1) through the pipe (M1) will be much more. If we lower the level of water so that it is 5 cm below and we repeat the process, we will see that the cloth will take more time to get totally wet and when it does the water flowing into the container (N1) will be less. Therefore, we conclude that the higher the level of water the more water is absorbed by the cloth. Thus we can alter the quantity absorbed by the cloth by altering the level of water inside the container, where the cloth is moisturized from.

Furthermore, if we use cloths of different thickness at the same level of water we will observe that the thicker cloth absorbs more water. In the experiment described above, we had no losses due to vaporization. If the experiment takes place under conditions of relative moisture under 100%, then from the surfaces of water there will be a constant vaporization according to the rules of vaporization. If a quantity of water is vaporized from the surface of the cloth in a specific time unit and such quantity is equal to that absorbed by the cloth from the container (G1), then the surface will remain constantly wet and we will not be given any water to the container (N1). Accordingly, if the quantity of vaporization from the surface of cloth is more than the one absorbed by the cloth, the cloth will not remain wet on its whole surface. By contrast, when the quantity of water vaporized is less than the one absorbed then the rest of the water will go to the container (N1). The water which was not vaporized but was instead collected in the collection container (N1) by means of the collector (L1) and the pipe (M1) can be brought back to the container (A1) until it vaporizes completely. In the way we have connected the container (G1), we can also connect many similar containers with the same pipe (F1) which will be fed with water from the same source, provided they are on the same level and in this way they will be moistening cloths of the same type (I1) creating very large surfaces from which vaporization will be effected. Moreover, at the end of many wet cloths we may put equal number of collectors of the type (L1) connected with the pipe (M1) bringing the remains of water into the collection container (N1). Using a fan we can produce air streams on the surface of these wet cloths which will accelerate the vaporization.

The system described above allows the level of water to change inside all the containers of the type (G1) by changing the position of the container (B1) and in this way it causes an alteration in the quantity absorbed by the cloths. Therefore, we are given the opportunity to adjust the quantity of absorption to the quantity of vaporization, increasing it when the vaporization is high and decreasing it when the vaporization is low so that the cloth is kept wet under any conditions of vaporization but also with the least quantities of water which will be flowing to the collection container (N1).

So far, we have shown the way to create large wet surfaces from which a vaporization will take place, with a small quantity of water and within a limited space by activating the molecular powers (of cohesion and relevance) so as to moisten the cotton cloth. The material of the cloth should not necessarily be cotton but any substance whose molecular powers are relevant to that of water. Some applications which make use of the phenomenon of the <<vaporization cold>> for the cooling of spaces will now be presented.

Figure 2:
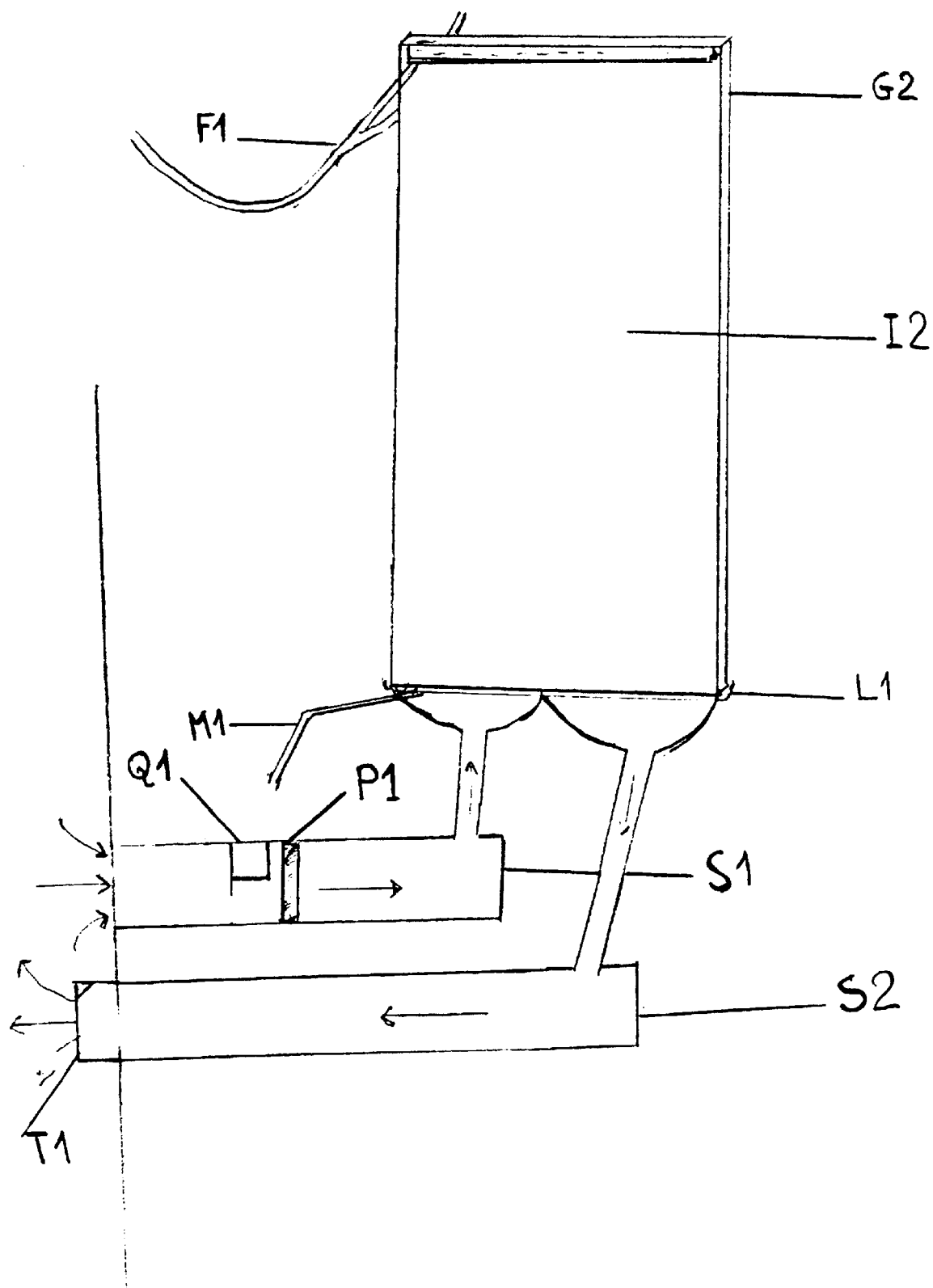
FIG. 2 which is complementary to FIG. 1, shows a "cooling body" covered by wet cloths and the air-channels with which it is connected, so that the air of the cooled room can circulate from the container back into the room by means of an electrical circulator.

In FIG. 2 we see a container (G2), which we will name the <<cooling body>> with the following dimensions: height 1 m, length 50 cm and width 2 cm (these dimensions are indicative rather than binding). The walls of this container are fixed on a thin framework and they are made of thin leaves of metal, e.g. 1/10000 m with a high thermal conductivity (e.g. copper, aluminium). The upper horizontal side of the container whose dimensions are 2 cm*50 cm has a groove 6 cm deep, 49 cm long and 1 cm wide. The bed of the groove is connected with the pipe (F1) (the groove of the container (G2) plays here the role of the container (G1). Inside this groove we plunge the ends of cotton cloths (I2) which cover tightly (like a stocking) all the surfaces of the container except the lower small side which has the same dimensions with the upper side. When we pour water into the groove with the process already described, the cloth will get wet due to the activation of the molecular powers of water and cotton. We make sure that there are no masses of air left between the wet cloth and the walls of the container which may act as an insulation inhibiting the easy absorption of heat by the walls of the container. Thus, the container (G2) will be covered by the constantly moistened cloth from which a vaporization will be effected causing inside the container (G2) a <<vaporization cold>>, proportional to the rules of vaporization. At the lower end of the sides covered by cloth we form a sort of an incision which will serve as a collector (L1) of water not vaporized and through the pipe (M1) will be brought to the collection container (N1). At the lower small end not covered by the cloth, we connect two insulated air-channels, one (S1) being the entrance and the other (S2) being the exit of the air of the cooled space, e.g. a room. The internal part of the container (G2) has become in this way air tight for the air of the external environment and the water found on its surface. The air-channels are connected with the cooled space. By means of a circulator (T1) (fan) we circulate the air of the cooled space, which, when in contact with the walls of the container (G2) being colder than it, will be leaving heat on them and thus it will be returning in the cooled space at a lower temperature. As regards the heat taken up by the walls of the cooling body, it is conducted to the mass of water, raising its temperature and therefore its vaporization speed.

In the air-channel (S1), and esp. the part found in the external environment, we put an air filter and an opening of an adjustable width so that we can renew the air whenever we wish. If we connect many cooling bodies with the pipe (F1) so that they can be fed with water simultaneously by the same source and if we also connect them with the same air-channels (S1) and (S2) and with the same system of collection of water not vaporized (M1) and (N1), we create an evaporative cooling system with very large surfaces from which we can make use of the <<vaporization cold>>. The only necessary condition for the creation of this multiple cooling bodies system is that they must all be at the same level, so that, when they are fed with water through the pipe (F1), the level of water in the groove of the upper side is equal in all the cooling bodies and as a result the cloths covered by the containers are impregnated with the same quantities of water.

The shape and size of such evaporative cooling systems must be the appropriate for the space in which they will be operating and for the cooling needs of such a space, designed either for a permanent installation or as a portable appliance. It would be most suitable for a portable evaporative cooling system suitable for the cooling of ordinary spaces, such as apartments, offices, stores etc. to have a small volume both when it operates and when kept aside. This can be achieved if the cooling bodies are fixed on a horizontal framework which will allow them to be on the same level and at the same time to move on it so that when they open, they may leave enough space and thus permit the vaporization process to take place and they may close when kept aside. Therefore, a system with 10 cooling bodies, all having the dimensions already mentioned above in the example, and with an effective vaporization surface over 10 $m^2$ gives us a volume of 0.5 $m^3$ when operating and under the proviso that each cooling body is 8 cm away from the other whereas it will have a volume of only 0.1 $m^3$ when each cooling body attaches one another. The air-channels and the feeding and water collection containers can be detached from the main body and their size may vary depending on the cooling need of each particular occasion. Such a cooling system may also comprise a fan which will be set in operation either on the intention of the user or automatically by means of a thermostat which will be activating it depending on the temperature of the space to be cooled in an attempt to maximize the cooling effect. Another typical evaporative cooling system may also comprise an electrical water pump (K1) which will be bringing back to the container (A1) the water which was not vaporized but instead was recollected in the container (N1) in order to make utter use of the water available. Moreover, containers (A1) and (B1) may be close to the cooling bodies or afar and they may also be either inside the space to be cooled or outside it provided that they necessarily are on the selected level.

By means of FIG. 3, a much more simple application of the invention is described, having nevertheless an excellent performance in spaces whose walls have openings covered by glass, such as windows, doors etc. In FIG. 3 we see the French window of a room (W3). On the side facing the external environment and at the upper end of its part made of glass, we fix a horizontal groovy-shaped container (G3) with the following dimensions: length, the same with that of the glassy part of the French window, height 6 cm and width 1 cm (the container (G3) plays here the role of the container (G1)). We connect the bed of the container (G3) with the pipe (F1) after we have placed the containers (A1) and (B1) on the suitable level and we feed the container (G3) with water. Inside the container (G3) we plunge the ends of a thin cotton cloth (I3) which covers the glassy surface of the French window leaving slight margins right and left so that water does not get in contact with any other part of the French window rather than its glass. When the cloth gets wet, we make sure there is no air left between the wet cloth and the glass which may inhibit the absorption of heat. When the cloth is wet, the molecular powers of water act in order to keep it firmly attached to the glassy surface. However, in order to achieve better stability we can use many techniques which vary according to the size and the position of these surfaces. For the usual openings there may be special hooks on the containers (G3) which will keep them firm as well as magnets which will be affixed on both the internal and external side of the crystals keeping the cloths firmly attached to the surfaces. The wet cloths do not inhibit the light and they can serve on the openings they cover like curtains. In this way when a vaporization takes place from the wet surface of the cloth covering the glassy part of the French window, the absorption of heat for the needs of the vaporization is effected in priority by the heat of the room and thus the glassy part of the window turns into an exit heat gate instead of being an easy and basic entrance gate (See Tables III and IV). With the uplifting or lowering of the container (B1) we can feed the cloth with the quantity of water needed for the vaporization according to the specific conditions of each case so that it can be kept wet on its whole surface. Furthermore, at the lower end of the glassy part of the French window and along the cloth, we put a collector (L1) of water connected with the pipe (M1) bringing the water not vaporized in the container (N1). In this way, the water gets in contact with the glass. When we want to stop the cooling effect, we can simply remove the cloths from the glassy parts.

If we have a space with many glassy parts of this sort such as doors and windows we can place on every one of them groovy containers of the (G3) type provided that they are all on the same level and we can connect them with the same pipe (F1) which will be feeding them with water of the same source and on the same level. Moreover, all the water collectors can be connected with the same pipe (M1) so that they can bring water not vaporized into the collection container (N1).

TABLE I

PERIOD: 1955–1993
From 14-8 to 31-8
Nea Philadelphia (Athens) Station: National Meteorological Service (N.M.S)

| TIME | 9.00 | 12.00 | 15.00 | 18.00 | 21.00 |
|---|---|---|---|---|---|
| Average Relative Moisture | 54.6 | 37.7 | 34.1 | 38.7 | 52.4 |
| Lowest Relative Moisture | 26.4 | 17.1 | 14.1 | 14.1 | 26.3 |
| Highest Relative Moisture | 90.5 | 84.6 | 90.8 | 92.2 | 100.0 |
| Average Temperature | 24.5 | 30.5 | 31.9 | 30.4 | 25.4 |
| Highest Temperature | 34.4 | 40.8 | 42.8 | 41.2 | 33.3 |
| Lowest Temperature | 16.8 | 19.0 | 21.0 | 21.8 | 17.8 |

TABLE II

PERIOD: 1955–1993
Nea Philadelphia Station: N.M.S
Average Temperature (6 + 12 + 18 + 24)/4
Average Relative Moisture (6 + 12 + 18)/3

| Months: | MAY | JUNE | JULY | AUGUST | SEPTEMBER |
|---|---|---|---|---|---|
| Temperature | 20.5 | 25.5 | 27.9 | 27.4 | 23.3 |
| Moisture | 54.4 | 46.5 | 43.5 | 45.2 | 53.9 |

TABLE III

Projection of the average temperature and relative moisture figures of Table I

| TIME | Temperature | Relat. Moisture | Wet Thermometer | Difference |
|---|---|---|---|---|
| 09.00 | 24.5 | 54.6 | 19 | 5.5 |
| 12.00 | 30.5 | 37.7 | 21 | 9.5 |
| 15.00 | 31.9 | 34.1 | 21 | 10.8 |
| 18.00 | 30.4 | 38.7 | 21 | 9.4 |
| 21.00 | 25.4 | 52.4 | 20 | 5.4 |

TABLE IV

Highest Temperature and Lowest Relative Moisture figures of Table I.

| TIME | Temperature | Moisture | Wet Thermometer | Difference |
|---|---|---|---|---|
| 09.00 | 34.4 | 26.4 | 21 | 13.4 |
| 12.00 | 40.8 | 17.1 | 22 | 17.8 |
| 15.00 | 42.8 | 14.1 | 23 | 19.8 |
| 18.00 | 41.2 | 14.1 | 22 | 19.2 |
| 21.00 | 33.3 | 26.3 | 20 | 13.3 |

The present invention and its proposed systems eliminate almost entirely the defects of the previous state of the art for the cooling of spaces where people live and work. Especially in areas where the climate is both hot and dry, the proposed evaporative cooling systems present the highest performance. In most areas in Greece the climate is almost ideal for the application of these evaporative cooling systems. The advantages of the evaporative cooling systems are:

1. Minimal cost, because the material of which they are made are very cheap whereas not so advanced a technological and mechanical infrastructure are required.
2. Their operation is based on the natural phenomenon of the vaporization of water and as a result it does not require enormous quantities of energy used by the previous state of the art. The quality of water used can be of any type, e.g. sea water, brackish water etc. This is extremely beneficial in terms of functional cost which is almost minimal, but also in terms of environment due to the conservation of energy.
3. The proposed systems are based on simple natural laws easily understandable even by non-experts, which makes their maintenance easy even for their users.

4. Their function is unlikely to cause accidents.
5. If we study Tables III and IV, we will observe that the performance of these evaporative cooling systems in contrast with the conventional appliances is maximized when the problem they are designed to solve is getting worse, i.e. the higher the temperature gets, the faster the vaporization takes place keeping the temperature of the <<vaporization cold>> almost steady, because the very same factors which aggravate the problem, constitute at the same time the reasons why the performance increases. One could compare it with a car which has a low performance when it runs without a load on a straight line or downhill and a high performance when it carries a heavy load and runs uphill.
6. They do not only abstain from thermal or other kind of environmental pollution but also affect positively the environment in which they operate, since contrary to the previous state of the art, they remove the heat absorbed during the vaporization permanently from this environment.
7. They have the ability to renew the air of the cooled space.
8. Their function in a dry environment does not in any way dry the cooled-space consuming excessive energy like conventional appliances do, but instead increases the relative moisture of the cooled space due to the decrease of air temperature that it causes, because when the air of the cooled space leaves heat on the cooling body, the temperature of the cooling body is almost constantly over the dew point.
9. The extensive use of these systems in a specific area, e.g. the Attica Basin could have a wider positive effect on the environment balancing the pollution already caused due to the increase of temperature and the decrease of moisture respectively.

What is claimed is:

1. An evaporative air-cooling system for the cooling of spaces, e.g. domiciles, offices, stores, warehouses etc., whose desirable temperature is around 24° C., which makes use of the vaporization of water from large wet surfaces created with a small mass of water and within a limited space into the free atmosphere, which has a system of controlled feeding of the surfaces from which the vaporization takes place with water, so that the feeding quantity of water is equal to the quantity of water vaporized, and is characterized by that it comprises a container (B1), placed at a selected level so as to feed with water as communicating vessels by means of a pipe (F1) which may have whichever length and therefore the container (B1) can be placed far from the surfaces, other groovy-shaped containers of a (G1) type, in relation to which the container (B1) is moveable and inside which the ends of cotton cloths (I1) or cloths of another material with molecular powers relevant to those of water are plunged and thus, the cloths are moistened on their whole surface due to the molecular powers of water and cotton; by that the container (B1) is connected with a flexible pipe (C1) which has a switch (E1) and which allows it to move easily upwards and downwards, and by that the level of water inside the container (B1) is constant, this being achieved either by connecting the container (B1) via the flexible pipe (C1) to another container (A1), which is closed air-tight and which is placed on a higher level than the container (B1) and constitutes the store of water, feeding the container (B1) with water at a steady level equal to that of the opening of the pipe due to the difference of pressure created inside the container (A1) or this being achieved by connecting the container (B1) via the pipe (C1) with a water network and the steady level of water inside the container (B1) being acheived with the use of a float inside the container (B1); while the moistened cloths may be placed on already existing surfaces of the spaces to be cooled, such as doors, windows, French windows etc., or on metal containers inside which the air of the spaces to be cooled circulates, and by moving the container (B1) upwards or downwards we change the level of water inside the groovy (G1) containers, increasing or reducing the absorbed quantity respectively.

2. Evaporative air-cooling method, using a system according to claim 1, characterized by the fact that it makes use of existing openings of the spaces to be cooled such as doors, windows, French windows etc., or openings created for this purpose, blocked by glass or other non-perishable when in contact with water material, e.g. aluminum, copper etc., by placing the moistened cloths (I3) on the surfaces of these openings from the side of the external environment, so that, when a vaporization is effected from the wet cloths which are in contact with the surfaces of these openings, heat is absorbed from the inside of the space turning these openings from basic heat entrance gates into exit gates.

3. Evaporative air-cooling system, acccording to claim 1, characterized by the fact that it makes use of existing openings of the spaces to be cooled such as doors, windows, French windows etc., or openings created for this purpose, blocked by glass or other non-perishable when in contact with water material, e.g. aluminium, copper etc., by placing the moistened cloths (I3) on the surfaces of these openings from the side of the external environment, so that, when a vaporization is effected from the wet cloths which are in contact with the surfaces of these openings, heat is absorbed from the inside of the space turning these openings from basic heat entrance gates into exit gates.

4. Evaporative air-cooling system according to claim 1, characterized by the placing of wet cloths on metal containers (G2) (cooling bodies) which have a small volume and large surfaces and whose walls are thin and have a high thermal conductivity, such as copper, aluminium etc., whose size, number and shape, either portable or affixed is determined by the cooling needs of the space, which are on the same level so that they are all fed with the same quantity of water, and are connected to insulated air-channels (S1) and (S2), through which and by using an electric circulator the air of the cooled space circulates, and thus, when a vaporization is effected from the wet cloths which cover the surfaces of the containers, heat is absorbed, causing a "vaporization cold" inside the container, i.e. a difference of temperature which is proportional to the vaporization speed (see Tables III and IV) and the air of the cooled space which circulates inside the containers touches the cooler walls of these containers leaving heat on them and it returns through an air-channel (S2) to the space at a lower temperature, while the high thermal conductivity of the walls contributes to the fast capture of the heat of the air which is further conducted to the small mass of water gathered on the surface, raising in this way its temperature and its vaporization speed.

5. Evaporative air-cooling system, according to claim 1, 3 or 4, characterized by the fact that it comprises an electric fan, which creates air streams on the surfaces from which the vaporization is effected, accelerating in this way the vaporization and the cooling effect.

6. Evaporative air-cooling system, according to claim 1, 3 or 4, characterized by the fact that it comprises a system of collection and recycling of the water which was not vaporized consisted of water collectors (L1), a pipe (M1), a container (N1) and a pump (K1).

7. Evaporative air-cooling system, according to claim 1 or 4, characterized by the existence of an air-filter (P1) and an opening (Q1) for the cleaning and the renewal of the air of the cooled space.

8. Evaporative air-cooling system, according to claim 1 or 4, characterized by the existence of an indoor thermostat, which, according to the temperature of the cooled-space, regulates the function of the circulator (T1).

9. Evaporative air-cooling system, according to claim 1, 3 or 4, characterized by the existence of an outdoor thermostat, which according to the temperature of the environment, activates an electrical mechanism which adjusts the level of the container (B1) and feeds the containers from which the cotton cloths are moistened with water depending on the needs of the vaporization.

* * * * *

UNITED STATES PATENT AND TRADEMARK OFFICE
CERTIFICATE OF CORRECTION

PATENT NO. : 6,341,499 B1
DATED : January 29, 2002
INVENTOR(S) : Polychronopoulos It is certified that error appears in the above-identified patent and that said Letters Patent is hereby corrected as shown below:

<u>Title page,</u>
Item [12], "Polychronopoylos" should be -- Polychronopoulos --
Item [76], "Assimios Polychronopoylos" should be -- Assimios Polychronopoulos --

Signed and Sealed this

Twenty-third Day of April, 2002

*Attest:*

*Attesting Officer*

JAMES E. ROGAN
*Director of the United States Patent and Trademark Office*